United States Patent [19]

Stegeman et al.

[11] Patent Number: 5,308,183
[45] Date of Patent: May 3, 1994

[54] LOCK COUPLING BETWEEN SHAFT AND ROTOR

[75] Inventors: George T. Stegeman, Harbor Beach; Walter J. Planck, Warren, both of Mich.

[73] Assignee: General Motors Corporation, Detroit, Mich.

[21] Appl. No.: 910,799

[22] Filed: Jul. 9, 1992

[51] Int. Cl.$^5$ .............................................. F16B 2/02
[52] U.S. Cl. .................... 403/259; 403/258; 403/326; 403/371; 474/150
[58] Field of Search ............... 403/260, 261, 258, 371, 403/374, 326, 259, 290, 368, 367, 365, 370; 474/150-152, 165, 902, 903; 411/433

[56] References Cited

U.S. PATENT DOCUMENTS

| | | | |
|---|---|---|---|
| 827,346 | 7/1906 | Bubb | 403/371 |
| 2,170,352 | 8/1939 | Schaefer | 403/258 |
| 2,210,790 | 8/1940 | Bernhard | 403/259 X |
| 3,009,747 | 11/1961 | Pitzer | 403/371 X |
| 3,424,019 | 1/1969 | Wolfram | 403/258 X |
| 3,899,257 | 8/1975 | Gladieux | 403/259 |
| 4,022,536 | 5/1977 | Piepho et al. | 403/16 |
| 4,425,816 | 1/1984 | Toyoda | 403/374 X |
| 4,623,277 | 11/1986 | Wayne et al. | 403/314 |
| 4,668,116 | 5/1987 | Ito | 403/258 |
| 4,778,303 | 10/1988 | Mullins | 403/11 |
| 4,790,683 | 12/1988 | Cramer, Jr. et al. | 403/372 |
| 4,828,423 | 5/1989 | Cramer, Jr. et al. | 403/372 |
| 4,886,391 | 12/1989 | Ragsdale, Sr. | 403/19 |
| 4,952,199 | 8/1990 | Saka et al. | 474/152 |

FOREIGN PATENT DOCUMENTS

| | | | |
|---|---|---|---|
| 509460 | 10/1930 | Fed. Rep. of Germany | 403/371 |
| 2629734 | 11/1977 | Fed. Rep. of Germany | 403/258 |
| 4-125351 | 4/1992 | Japan | 474/903 |
| 781418 | 11/1980 | U.S.S.R. | 403/259 |
| 28135 | of 1908 | United Kingdom | 403/261 |

Primary Examiner—Randolph A. Reese
Assistant Examiner—Harry C. Kim
Attorney, Agent, or Firm—C. K. Veenstra

[57] ABSTRACT

A timing sprocket is secured to a camshaft by a locking coupling so that before the coupling is tightened the sprocket will free wheel on the shaft for adjustment purposes and yet be firmly supported against tipping under load, and when tightened the sprocket is locked to the camshaft. The sprocket has a bore fitting on the shaft and a counterbore accommodating a longitudinally split locking ring. A taper between the bore and the counterbore matches a taper on the end of the locking ring. A bolt axially threaded into the camshaft end moves the locking ring from the loose condition where the sprocket can rotate on the shaft to a tight condition where the tapers compress the ring against the shaft and clamp the sprocket for rotation with the camshaft.

7 Claims, 2 Drawing Sheets

LOCK COUPLING BETWEEN SHAFT AND ROTOR

TECHNICAL FIELD

This invention relates to a coupling between a shaft and a rotor, such as a camshaft and a timing sprocket, and particularly such a coupling which allows relative rotation and adjustment prior to tightening and a locking relationship after tightening.

BACKGROUND

It is known in the art relating to automotive engine manufacture and timing the camshafts of engines to loosely install the sprockets on the camshafts to allow free rotation of the sprockets, lock the camshafts into an index position, install the timing belt on the drive sprockets, rotate the engine several times to seat the belts (with the sprockets free-wheeling on the camshafts), index the crankshaft to a predetermined position, and then lock the sprockets onto the camshafts.

Previous arrangements for mounting the sprockets on the camshafts required that the nose of the camshaft be hardened and have a special profile with very precise size tolerances, the sprocket have a counterbore spaced from the shaft, two rings fitting into the space between the shaft and counterbore, a washer for pushing the rings into the space with a specific force to achieve a press fit, and a bolt threaded into the shaft end to push the washer against the rings. During the free-wheeling part of the timing operation the bolt is not yet tightened and the sprocket tips excessively due to limited support or alignment control. During tightening, the press force must be monitored.

It has also been proposed to use tapered rings and shafts for the coupling with sprockets but they tend to bind the sprocket or lock up during free wheeling, and they pop out of position under load and can not prevent the sprocket from tipping.

SUMMARY OF THE INVENTION

The present invention provides a coupling between a camshaft and a sprocket which allows free-wheeling of the sprocket on the camshaft without objectionable tipping. It also provides a simpler design with fewer parts, more relaxed tolerances, no special treatment of the parts to support the forces, and a simple installation.

These and other features and advantages of the invention will be more fully understood from the following descriptions of certain specific embodiments of the invention taken with the accompanying drawings.

BRIEF DRAWING DESCRIPTION

DETAILED DESCRIPTION

The ensuing description is directed to mechanisms for driving camshafts. Such mechanisms may include gears or sprockets driven by the gears or a timing chain or pulleys driven by a timing belt. The term "sprocket" is used herein to refer also to both gears and pulleys. Thus the described coupling arrangement for securing sprockets to camshafts is also applicable to gears and pulleys. The term "rotor" includes such "sprockets" as well as other shaft mounted drive and driven members.

Figure 1:
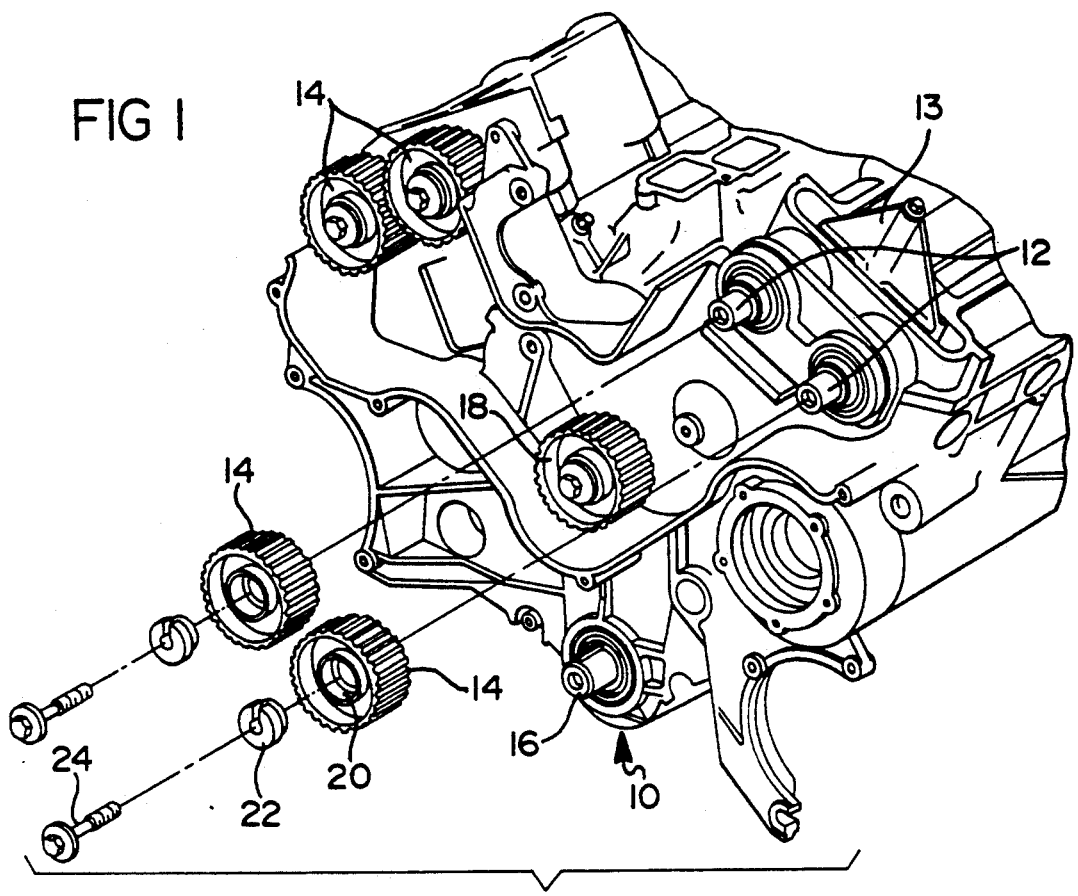
FIG. 1 is an isometric view of the front portion of a partly assembled engine with timing sprockets both as assembled and in exploded view according to the invention.

The partially assembled engine 10 shown in FIG. 1 is a V block engine with four camshafts 12 and a sprocket 14 mounted on each camshaft. The engine also includes a crankshaft 16 and a timing belt driver sprocket 18 which rotates synchronously with the crankshaft 16 but at half the speed. A timing belt, not shown, is held in a path engaging the driver sprocket 18 and the camshaft sprockets 14 for rotating the camshafts during normal operation. Each sprocket 14 has a counterbore 20 for receiving a compressible spacer or locking ring 22, and a bolt 24 threaded into the end of each camshaft holds the locking ring and the sprocket on the camshaft.

Figure 2:
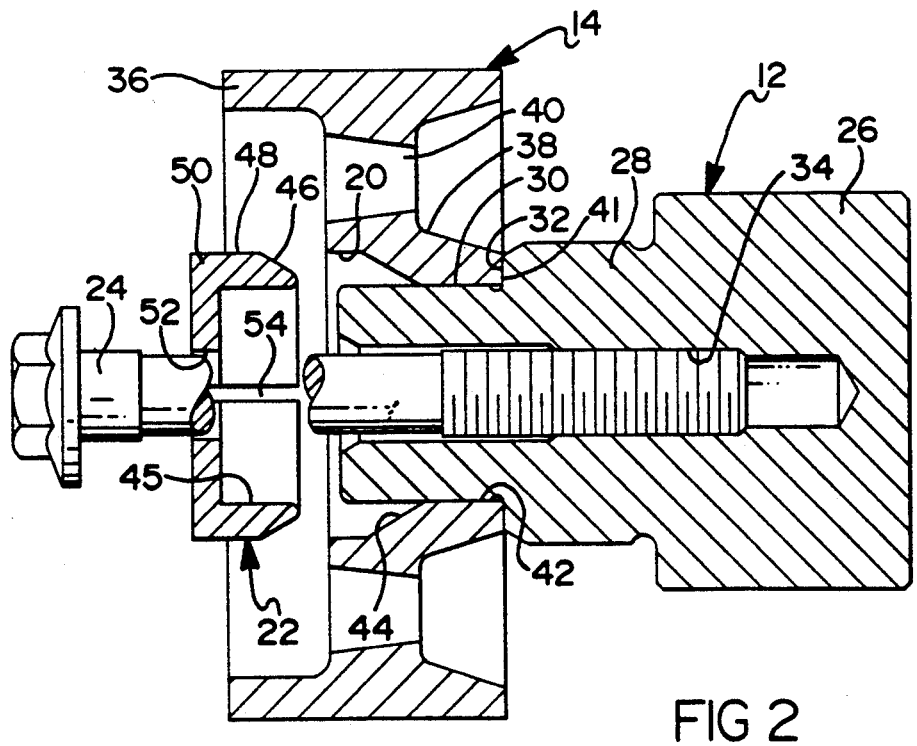
FIG. 2 is an exploded cross section of a camshaft end and sprocket assembly according to the invention.
Figure 3:
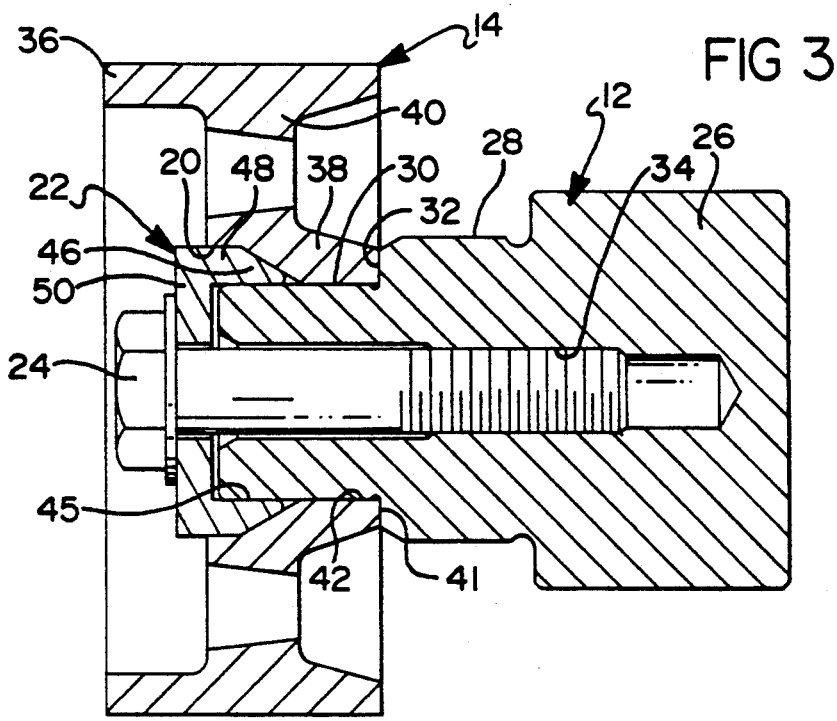
FIG. 3 is an assembled cross section of the camshaft and sprocket assembly of FIG. 2.
Figure 4:
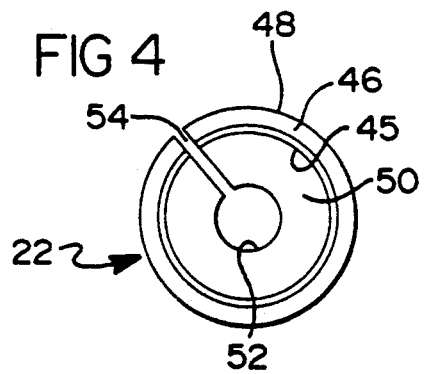
FIG. 4 is an end view of a locking ring according to the invention.

As shown in FIGS. 2 and 3, the camshaft 12 has stepped diameters resulting in a main body 26, a smaller body 28 and a reduced end portion 30 such that a shoulder 32 is formed between the end portion and the smaller body. The end of the camshaft 12 contains a threaded axial bore 34 to receive the bolt 24. The sprocket 14 has a toothed peripheral ring 36, a central hub 38 and a web 40 which connects the ring 36 and the hub. The hub 38 extends one direction from the web toward an inner end face 41 of the sprocket which abuts the shoulder 32 on the camshaft 12. The sprocket also includes a bore 42 in the hub 38 which mates with the shaft end portion 30 adjacent the shoulder 32, the counterbore 20 which is cylindrical and is adjacent the shaft end, and a taper or conical section 44 interconnecting the bore 42 and the counterbore 20. The angle of the taper is large enough to make a non-locking fit with the locking ring 22; while an angle in the range of 15° to 50° is acceptable for that purpose, the preferred angle is on the order of 30°. Other angles may be chosen, even those which are not self-release tapers, i.e. angles less than 15°. The locking ring 22, which is also shown in FIG. 4, is a cup-shaped member having a cylindrical inner surface 45 which mates with the end portion 30 of the camshaft 12, a tapered or conical nose portion 46 which mates with the conical section 44 of the sprocket 14, a cylindrical section 48 adjacent the nose portion 46 and which fits snugly within the counterbore 20, and an integral washer 50 having an aperture 52 for the bolt 24. A longitudinal slot 54 along one radial plane of the locking ring allows it to be compressed to ground the inner surface 45 against the end portion 30.

Hardening or other special treatments on the camshaft end or of the locking ring or sprocket are not required and close tolerances are not needed. The locking ring may be made of steel of other durable material and may be made, for example, by turning, powdered metal techniques, or even by cold forging for lower cost. While substantial design freedom is permitted in the selection of the angle of the tapered regions 44 and 46, small angles on the order of 8° or 10° should be avoided since locking will occur in that range. The locking tapers could result in inadvertent locking when free-wheeling is desired and, in the event removal of the sprockets is desired, the locking ring would be difficult to remove. These problems do not occur with the non-locking taper angle.

In use, the sprockets 14, locking rings 22 and bolts 24 are assembled to the camshafts 12, but initially the bolts are left a few turns from their tightened position. In that condition the cylindrical section 48 of the locking ring 22 fits in the counterbore 20 of the sprocket 14 and supports the sprocket against tipping. The parts are sized to permit free rotation of the sprockets on the camshafts. The timing belt is assembled to the sprockets 14 and 18 and the camshafts 12 are locked in an index position by a temporary lock fixture 13 (FIG. 1). The crankshaft is rotated a few times to seat the belt causing the sprockets to free-wheel on the camshafts. Finally the crankshaft is accurately positioned to accord with the index position of the camshafts 12, the bolts 24 are tightened to lock the sprockets onto the camshafts, and the lock fixtures 13 are removed.

When a bolt 24 is tightened, it clamps the conical nose section 46 against the conical section 44 of the sprocket and also forces the face 41 of the sprocket against the shoulder 32 to positively locate the sprocket on the camshaft. The locking ring is compressed, as allowed by the slot 54, against the shaft end portion 30. Thus the sprocket is locked to the camshaft through the locking ring to the end portion 30 and through the end face 41 to the shoulder 32.

Figure 5:
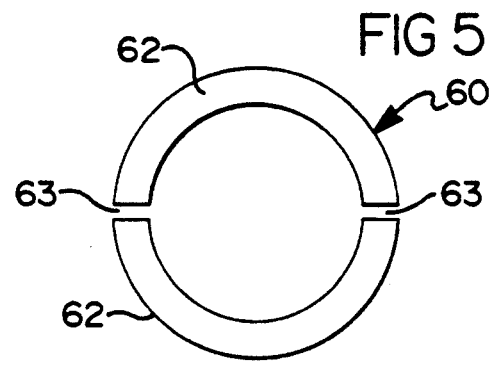
FIG. 5 is an end view of a locking ring according to another embodiment of the invention.
Figure 6:
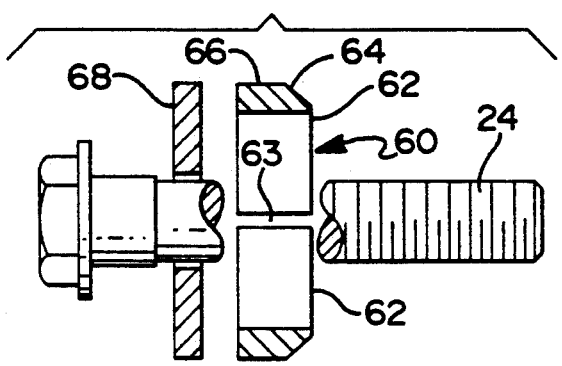
FIG. 6 is an exploded cross section of a locking ring and washer assembly according to the FIG. 5 embodiment of the invention.
Figure 7:
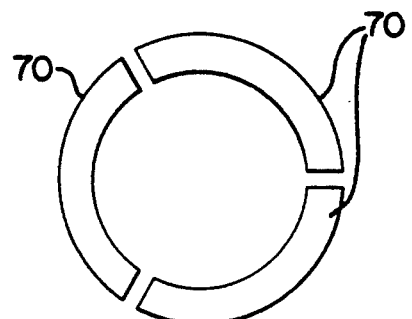
FIG. 7 is an end view of a locking ring according to a third embodiment of the invention.

An alternative locking ring 60 is shown in FIGS. 5 and 6 and comprises two arcuate parts 62 having semi-cylindrical inner surfaces and separated at their ends by gaps 63 when installed. Each part 62 has a tapered nose 64 and a cylindrical section 66 equivalent in shape and function to the tapered section 46 and cylindrical section 48 of the first embodiment. A separate flat washer 68 is used to push the parts 62 into the counterbore of the sprocket as the bolt 24 is tightened. This alternative design functions in the same way as the first embodiment. It may have an advantage of ease of fabrication but has the drawback of more parts to handle during assembly. Still another embodiment is shown in FIG. 7 and comprises three arcuate parts 70 instead of the two parts 62. Whether two, three or more parts are used, they collectively define inner and outer cylindrical surfaces and a conical surface.

It will thus be seen that the present invention provides a significantly improved locking mechanism allowing free-wheeling operation when the bolt is not tightened yet providing a sturdy mounting for rotation without tipping when load is applied by the belt, and a securely locked assembly when the bolt is tightened. The locking mechanism not only has improved performance, but it also is less expensive to manufacture since it does not require special treatments and close tolerances.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. Means for coupling a shaft and a rotor comprising:
    a shaft having an end, a shoulder spaced from the end and a cylindrical portion between the shoulder and the end;
    a rotor having an end face engaging the shoulder and having a bore mating with the cylindrical portion, a cylindrical counterbore larger than and concentric with the cylindrical portion, and an inwardly tapered section connecting the bore and the counterbore;
    locking means between the shaft and the rotor and having cylindrical inner and outer surfaces contacting the cylindrical portion and the counterbore respectively, the locking means having tapered end means in mating engagement with the tapered section; and
    threaded fastener means connected axially to the shaft for drawings the locking means toward the shoulder for loosely fastening the shaft and the rotor to permit rotary adjustment between the shaft and the rotor and for selectively tightly fastening the shaft and the rotor for locking the shaft and rotor against rotation.

2. Coupling means for connecting a camshaft and a timing sprocket for selective relative rotation of the sprocket on the camshaft and for joint rotation of the sprocket with the camshaft comprising:
    a camshaft having a cylindrical end portion;
    a sprocket having a bore seated on the end portion and a cylindrical counterbore of greater diameter than the cylindrical end portion and coaxial with the end portion;
    means for stably supporting the sprocket on the end portion comprising compressible spacer means having cylindrical outer and inner surfaces for rotatably mating with the counterbore and the end portion respectively; and
    means selectively operable for locking the camshaft and sprocket together including means for compressing the spacer means to grip the end portion and for clamping the spacer means against the sprocket.

3. The invention as defined in claim 2 wherein the spacer means comprises a tubular member longitudinally slotted to permit compression.

4. The invention as defined in claim 2 wherein the spacer means comprises a plurality of spaced arcuate members collectively defining the inner and outer cylindrical surfaces.

5. Coupling means for connecting a camshaft and a timing sprocket for selective relative rotation of the sprocket on the camshaft and for joint rotation of the sprocket with the camshaft comprising:
    a camshaft having a cylindrical end portion;
    a sprocket having a bore seated on the end portion and a cylindrical counterbore of greater diameter than the cylindrical end portion and coaxial with the end portion;
    means for stably supporting the sprocket on the end portion comprising compressible spacer means having cylindrical outer and inner surfaces for rotatably mating with the counterbore and the end portion respectively; and
    means selectively operable for locking the camshaft and sprocket together including means for compressing the spacer means to grip the end portion and for clamping the spacer means against the sprocket, and wherein the means for locking comprises an inwardly tapered surface extending from the sprocket counterbore to the bore, an outer tapered surface on an end of the spacer means mating with the inwardly tapered surface, and means for urging the spacer means axially to forcibly engage the tapered surfaces, whereby the sprocket and camshaft are locked together for joint rotation when the spacer means is urged axially, and the sprocket and spacer means are relatively rotatable when the spacer means is not urged axially.

6. The invention as defined in claim 5 wherein the means for urging the spacer means axially comprises a threaded fastener coupled to the camshaft concentric with the camshaft axis.

7. The invention as defined in claim 5 wherein the sprocket has an end face adjacent the inwardly tapered surface; and the means for locking further includes a shoulder on the camshaft bearing against the end face of the sprocket, whereby when the spacer means is urged axially the sprocket is clamped between the outer tapered surface and the shoulder.

* * * * *